United States Patent [19]
Fitch et al.

[11] 4,145,395
[45] Mar. 20, 1979

[54] DEACTIVATING PARTICULATE WASTE CONTAINING HYDROLYZABLE METAL CHLORIDES

[75] Inventors: Steven J. Fitch, Baltimore; Philip R. Peeling, Finksburg, both of Md.

[73] Assignee: SCM Corporation, New York, N.Y.

[21] Appl. No.: 761,875

[22] Filed: Jan. 24, 1977

[51] Int. Cl.$^2$ ............................................. C01B 7/01
[52] U.S. Cl. .................................... 423/1; 423/481; 423/633
[58] Field of Search ................. 423/481, 492, 74, 76, 423/613, 437, 461, 1; 252/445, 447

[56] References Cited

U.S. PATENT DOCUMENTS

| | | | |
|---|---|---|---|
| 507,331 | 10/1893 | Salomon | 423/437 |
| 1,903,834 | 4/1933 | Oberle | 252/445 |
| 2,257,907 | 10/1941 | Griswold | 252/445 |
| 2,413,292 | 12/1946 | Christensen | 423/481 |
| 2,471,844 | 5/1949 | Strelzoff | 423/481 |
| 2,592,580 | 4/1952 | Loevenstein | 423/481 |
| 2,653,078 | 9/1953 | Lane | 423/613 |
| 2,701,179 | 2/1955 | McKinney | 423/74 |
| 2,791,490 | 5/1957 | Willcox | 423/613 |
| 2,884,303 | 4/1959 | Metrailer | 423/437 |
| 3,074,777 | 1/1963 | Cortes | 423/74 |
| 3,074,783 | 1/1963 | Paull | 423/437 |
| 3,311,452 | 3/1967 | Goodgame et al. | 423/613 |
| 3,486,913 | 12/1969 | Zirngibl et al. | 423/613 X |
| 3,578,401 | 5/1971 | Ueberle et al. | 423/481 |
| 3,832,306 | 8/1974 | Hackett et al. | 252/447 |

FOREIGN PATENT DOCUMENTS 734080 7/1955 United Kingdom ..................... 423/481

*Primary Examiner*—Brian Hearn
*Attorney, Agent, or Firm*—Jerry K. Mueller, Jr.

[57] ABSTRACT

Particulate waste comprising hydrolyzable metal chlorides, typically chlorinated byproducts from the chlorination of titaniferous material, is treated in an oxidizing atmosphere at elevated temperature for depleting it of chlorine and for subsequent recovery of values.

4 Claims, No Drawings

DEACTIVATING PARTICULATE WASTE CONTAINING HYDROLYZABLE METAL CHLORIDES

This invention relates to a process for deactivating particulate waste comprising hydrolyzable metal chlorides (including oxychlorides, if present) in economical manner.

BACKGROUND

Typical of such waste products are chlorinator byproducts from the chlorination of titaniferous materials such as a chlorination of rutile or ilmenite ore with coke in the manufacture of pigmentary titanium dioxide or in the beneficiation of ilmenite ore with chlorine and coke. The term "cyclone solids" is derived from the collection of such particulate wastes by cyclone separators from a vapor stream, often a fluidized bed reactor, although other conventional reactor and collector types are useful also. Accordingly, the term need not be construed narrowly. Such wastes are usually about 120 mesh (U.S. Standard Sieve) or finer. They fume obnoxiously in ordinary humid air to give off deleterious and corrosive hydrogen chloride. Representative titaniferous ore chlorinator byproducts will contain unreacted (and/or partially reacted) ore, coke, ferrous chloride, ferric chloride, and minor amounts of the chlorides and oxychlorides of vanadium, chromium, niobium, titanium, magnesium, aluminum, silicon, and zirconium (the vanadium usually thought of as being in the vanadyl (VO) form).

If sufficient of these wastes can be supplied to a central location in convenient and unobnoxious form, the recovery of at least minor components such as vanadium and/or niobium therefrom can be attractive commercially. In some cases it is adequate to quench them with water as described in the copending patent application of Steven J. Fitch and Charles A. Tanner entitled *Process for Quenching of Fine Particulates*, Ser. No. 749,235, filed Dec. 10, 1976. The teachings of this application are incorporated herein expressly by reference. While such quenching process renders such product handy and nonobnoxious for shipping to a central location, considerable chlorides can be left in the derivative product, and such chlorides constitute a disposal problem for recovery processing in some locations. The instant process eliminates that problem and can be used on the products of this cited patent application or directly on the wastes themselves. Chlorination of various alumina- and zirconia-bearing material with carbon can give rise to related wastes which also can be processed in accordance with the instant invention.

BROAD STATEMENT OF THE INVENTION

The instant process deactivates such particulate waste by subjecting it to treatment with molecular oxygen at elevated temperature in a treating zone until the resulting residue is substantially depleted of chlorine, then withdrawing said residue from said zone.

DETAILED DESCRIPTION OF THE INVENTION

The process can be practiced at remarkably low temperature, eg. about 600° C. and above, and in many cases such processing can be done in a few minutes, eg. as low as 3-5 minutes. In order to recover evolved chlorine as hydrogen chloride it is advantageous to perform the treatment in the presence of water vapor using sufficient of that to insure that substantially all of the available chlorine evolves as hydrogen chloride. This is readily recovered by conventional methods such as absorption in water. In some cases it is advantageous to treat the waste in the form of granules made by the quenching process referred to above; in this instance some of the chlorides are already hydrolyzed and residual water in the granules helps attain such objective. Water also from the combustion of gaseous or liquid hydrocarbon fuel is useful in the operation.

Higher temperatures, of course, can be used for the treatment and the oxidizing atmosphere is most inexpensively established with air as the source of molecular oxygen. Frequently there is enough coke in the waste to make the treatment self-sustaining as to heat. At the lower operating temperatures, as shown in the following example, the coke, even in finely divided state, is very little affected. Temperatures of 1,000° C. of higher, of course, can be used, but are more costly.

The treated waste from this process can be briquetted where necessary or desirable typically with a little water or aqueous waste liquor, advantageously those containing starch, molasses, etc. The cooled product can be handled readily in covered, preferably steel, equipment without fuming. In many instances it is desirable to recover at least a portion of one or more of the ingredients of the waste particulate chlorinator byproduct before it is subjected to the instant process. Thus, coke, being the least dense material in such byproduct, can be separated, eg. by air classification, and, where various other materials have appreciable density differences, they also can be separated. Separation by magnetic susceptibility and electromagnetic susceptibility also are possible (although the iron content in such byproduct is not appreciably magnetic). Ores such as ilmenite can take a slight electrical charge and be separated electrostatically from materials that are strongly negatively charged with respect to metals such as brass or steel, eg. quartz and other gangues. Materials of construction for the process include ceramics and refractories, corrosion- and heat-resistant metal alloys, and plastic or plastic-coated metals for low temperature handling.

The following example shows how the invention has been practiced but should not be construed as limiting it. In this specification all parts are parts by weight, all percentages are weight percentages, and all temperatures are in degrees Centigrade.

EXAMPLE

Chlorinator byproduct solids from the chlorination of rutile ore with coke and elemental chlorine was loaded at room temperature into a fine mesh support to form a bed a few centimeters deep. This mass then was subjected to heating with a natural gas/air flame played on the bottom of the foraminous support. These byproducts were collected from cyclone separation at a chloride process titanium dioxide plant; 40% of them were coarser than 230 mesh U.S.S., the balance finer. Typically they contained 26.58% chlorine, 40.63% HCl insolubles (using 10% aqueous HCl), loss on ignition of insolubles of 34.44%, total iron of 6.55%, and bulk density of 32.42 pounds per cubic foot (about 0.25 kg./liter). Overhead vapors were exhausted by means of a hood.

The base of the bed attained was estimated to be 1,200° F. (650° C.). A number of trials showed that in about 3–5 minutes not more than 2% chlorine remained in the residue, but such residue contained coke which appeared to be substantially unaffected. When cooled, the residue was non-fuming in air, and the residue product could be briquetted with inexpensive binder such as asphalt emulsion for shipment.

From the foregoing speed of the reaction it appeared that a suitable large reactor could have product residue recycled into it to take advantage of possible oxidation catalysts from said residue, and also that the reaction could be conducted in a moving bed or fluidized bed reactor continuously discharging solid residue as product.

We claim:

1. A process for dechlorinating a mass of particulate waste obtained from the chlorination of titaniferous materials in the presence of carbon, said waste containing elemental carbon and hydrolyzable metal chlorides including iron chloride, which comprises:

subjecting said waste to treatment with molecular oxygen at elevated temperature of about 325° to 650° C. in a treating zone until the resulting residue is substantially depleted of chlorine while retaining most of said carbon, said treatment conducted in the presence of water vapor for converting said chlorine into hydrogen chloride; and withdrawing said residue from said zone.

2. The process of claim 1 wherein said treatment is done with air as the source of said molecular oxygen.

3. The process of claim 2 wherein the water vapor present is sufficient for converting substantially all of available chlorine into hydrogen chloride.

4. The process of claim 1 wherein said solids are in partially hydrolyzed, agglomerated state.

* * * * *

UNITED STATES PATENT AND TRADEMARK OFFICE
CERTIFICATE OF CORRECTION

PATENT NO. : 4,145,395
DATED : March 20, 1979
INVENTOR(S) : Steven J. Fitch and Phillip R. Peeling It is certified that error appears in the above-identified patent and that said Letters Patent are hereby corrected as shown below:

At the beginning of the title before "DEACTIVATING", insert -- PROCESS FOR--.

Column 2, line 19, change "of" to --or--.

Column 3, line 11, change "catalysts" to --catalysis--.

Signed and Sealed this

Eleventh Day of September 1979

[SEAL]

*Attest:*

LUTRELLE F. PARKER
*Attesting Officer      Acting Commissioner of Patents and Trademarks*